United States Patent
Jiang et al.

(10) Patent No.: US 9,471,705 B2
(45) Date of Patent: *Oct. 18, 2016

(54) PREDICTIVE RESOURCE IDENTIFICATION AND PHASED DELIVERY OF STRUCTURED DOCUMENTS

(75) Inventors: Changhao Jiang, San Jose, CA (US); Xiaoliang Wei, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 894 days.

This patent is subject to a terminal disclaimer.

(21) Appl. No.: 13/285,108

(22) Filed: Oct. 31, 2011

(65) Prior Publication Data

US 2012/0041980 A1 Feb. 16, 2012

Related U.S. Application Data

(63) Continuation of application No. 12/638,910, filed on Dec. 15, 2009, now Pat. No. 8,108,377.

(51) Int. Cl.
*G06F 17/30* (2006.01)

(52) U.S. Cl.
CPC ............................... *G06F 17/30905* (2013.01)

(58) Field of Classification Search
CPC ..................... G06F 17/30896; G06F 17/2247; G06F 7/30905
USPC .......................................... 707/705; 715/200
See application file for complete search history.

(56) References Cited

U.S. PATENT DOCUMENTS

| 6,070,185 | A | * | 5/2000 | Anupam et al. | 709/204 |
|---|---|---|---|---|---|
| 7,331,038 | B1 | | 2/2008 | Snodgrass et al. | |
| 7,376,653 | B2 | * | 5/2008 | Hart, III | H04L 67/06 707/957 |
| 8,051,372 | B1 | * | 11/2011 | Sandhaus | 715/234 |
| 8,108,377 | B2 | * | 1/2012 | Jiang et al. | 707/705 |
| 8,230,046 | B2 | * | 7/2012 | Jiang | 709/219 |
| 8,639,743 | B1 | * | 1/2014 | Colton et al. | 709/203 |
| 2002/0032701 | A1 | * | 3/2002 | Gao | G06F 17/30902 715/240 |
| 2003/0144988 | A1 | * | 7/2003 | Nareddy et al. | 707/1 |
| 2004/0133852 | A1 | * | 7/2004 | Kolb | G06F 17/24 715/227 |
| 2004/0260600 | A1 | | 12/2004 | Gross | |
| 2006/0064411 | A1 | * | 3/2006 | Gross et al. | 707/3 |
| 2008/0222242 | A1 | * | 9/2008 | Weiss et al. | 709/203 |
| 2009/0282333 | A1 | * | 11/2009 | Olsen | G06F 9/4448 715/703 |
| 2010/0023475 | A1 | * | 1/2010 | Lahav | 706/59 |
| 2010/0153353 | A1 | | 6/2010 | Angell et al. | |
| 2010/0191856 | A1 | * | 7/2010 | Gupta et al. | 709/228 |

* cited by examiner

*Primary Examiner* — James Trujillo
*Assistant Examiner* — Jessica N Le
(74) *Attorney, Agent, or Firm* — Baker Botts L.L.P.

(57) ABSTRACT

In one embodiment, a method includes receiving a request for a target structured document. In a first response phase, the method includes accessing a data structure comprising an entry for the target structured document and one or more first resources associated with the target structured document, generating a first response portion including a first portion of the target structured document including one or more of the first resources or references for one or more of the first resources, and transmitting the first response portion to the client. The method further includes, in a second response phase, generating a second response portion that includes a second portion of the target structured document including one or more of: one or more second resources, or references for the one or more second resources, associated with the target structured document; and structured document language code, and transmitting the second response portion to the client.

21 Claims, 5 Drawing Sheets

PREDICTIVE RESOURCE IDENTIFICATION AND PHASED DELIVERY OF STRUCTURED DOCUMENTS

CROSS-REFERENCE TO RELATED APPLICATION

The present application is a continuation application of pending U.S. patent application Ser. No. 12/638,910 filed Dec. 15, 2009, and entitled "Predictive Resource Identification and Phased Delivery of Structured Documents."

TECHNICAL FIELD

The present disclosure relates generally to serving structured documents (such as web pages) to remote clients and, more particularly, to using predictive resource identification and phased, partial delivery of structured documents for use in efficiently rendering structured documents and decreasing perceived rendering time.

BACKGROUND

Conventionally, when a request for a web page or other structured document transmitted by a client device is received by a server or computing system hosting the web page, the hosting system typically generates a base web page in the form of an Hyper Text Markup Language (HTML), Extensible Markup Language (XML), or other web browser-supported structured document. The generated structured document is then transmitted as a whole in a response to the requesting client via a Hypertext Transfer Protocol (HTTP) or other suitable connection for rendering at the client device. The structured document may include one or more resources (e.g. a JavaScript script or resource, a Cascading Style Sheet (CSS) resource, an image, a video, etc.), or references to such resources, embedded within the transmitted document. By way of example, a resource embedded in an HTML document may generally be included or specified within a script element, image element, or object element, among others, depending on the type of resource. The element referencing or specifying the resource may include a source attribute (e.g., src) identifying a location of the resource to the client requesting the web page. Typically, upon receipt of the response, the web browser or other client application running at the client device then constructs a document object model (DOM) representation of the received structured document and requests the resource(s) (which may be at one or more other external locations) embedded in the document.

DESCRIPTION OF EXAMPLE EMBODIMENTS

Figure 1:
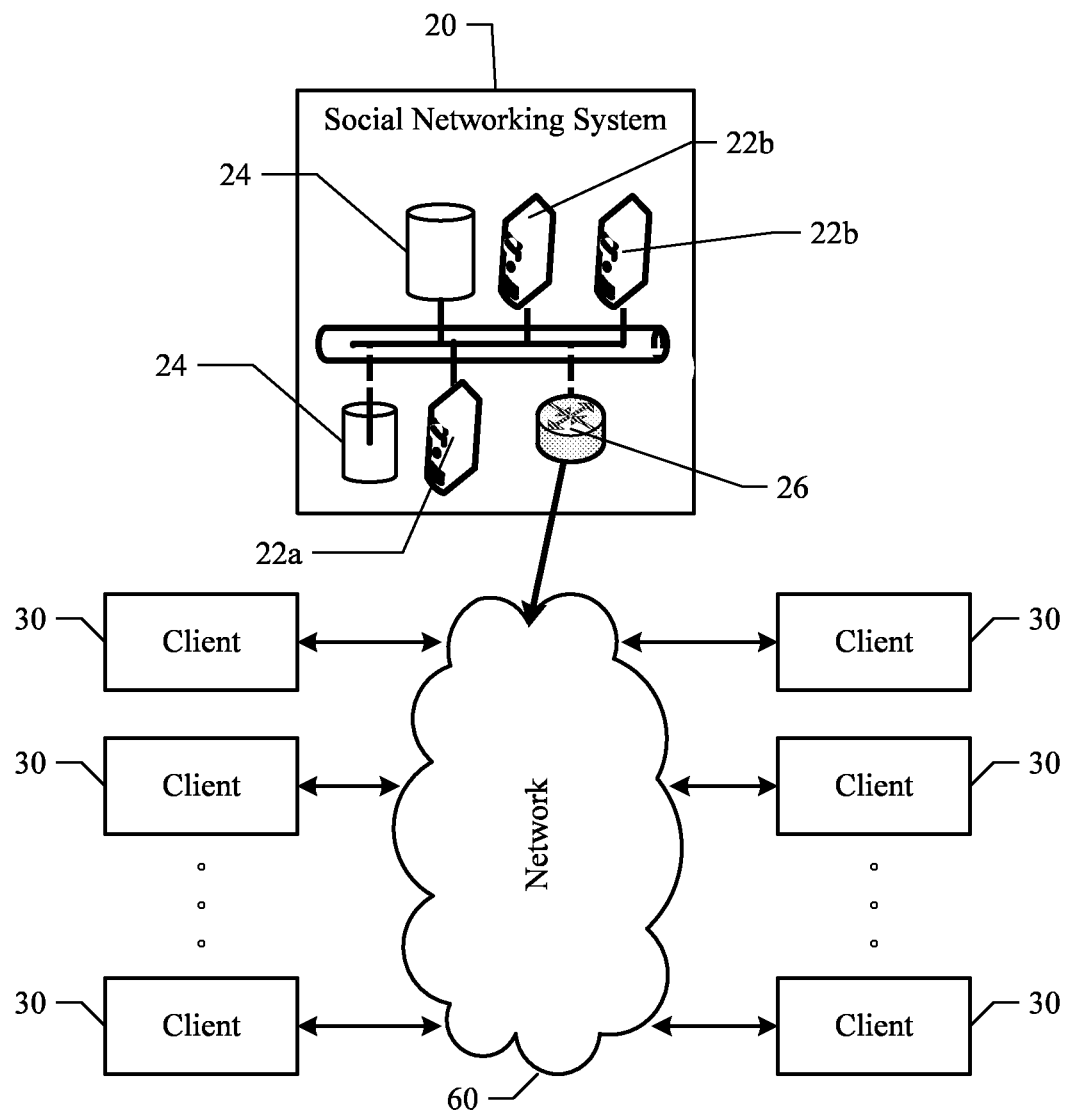
FIG. 1 illustrates an example network environment.

Particular embodiments relate to efficiently generating and rendering web pages and other structured documents. Particular embodiments relate to accessing a resource utilization log to predict what resources may be required for a particular web page before the web page is actually generated and transmitted to a client computing device, or even requested by a client computing device. More specifically, in particular embodiments, when a web page (such as a profile page, home page, or canvas page) requested by a client computing device is generated by a server or system hosting the web page, one or more servers, databases (e.g., MySQL), and/or data warehouses log the underlying resources included in or specified in the response to the request that are required for rendering that particular web page at the client device. In particular embodiments, the one or more servers, databases, and/or data warehouses log some or all of the requests transmitted from some or all of the users and corresponding client computing devices associated with the web site or system hosting the web page. In particular embodiments, an offline process scans and filters the resource utilization log to generate a data array that associates selected web pages with one or more corresponding resources that, based on the analysis of the resource utilization log, are statistically determined to be likely required for rendering the corresponding web page at a client device in response to a subsequent request for the web page at a later time point. That is, in particular embodiments, only those resources that are determined to be statistically likely to be required are included in the data array.

Particular embodiments further relate to a phased approach to serving a requested structured document, such as a web page. In particular embodiments, when a request for a particular web page is received by the host server or system, the host checks a data array to identify the resources that are likely to be required in rendering the web page. In particular embodiments, the host transmits these resources, or references to these resources, in a first response or first response portion that corresponds to a first portion of the requested web page. Subsequently, the host proceeds to generate the remainder of the requested web page and formulates a second response or second response portion that includes the rest of the web page and resources, or references to such resources, not transmitted in the first response portion. That is, while the host generates the entire web page, only those resources not included in the first response portion are included in the second response portion and subsequently transmitted to the client device. In this way, the client device may start downloading the resources identified in the first response portion, such as embedded scripts and style sheets, while the rest of the web page is being generated by the host, thereby potentially reducing the time required to render the web page at the client device. In particular embodiments, all resources actually required for rendering the web page (as determined when the web page is generated by the host) are logged in the resource utilization log, while resources not used to render the web page, including unused or unnecessary resources sent in the first response portion, are not logged in the resource utilization log.

In various example embodiments, one or more described web pages may be associated with a social networking system. However, alternate embodiments may have application to the retrieval and rendering of structured documents hosted by any type of network addressable resource or web site. Additionally, as used herein, a "user" may be an individual, a group, or an entity (such as a business or third party application).

Particular embodiments may operate in a wide area network environment, such as the Internet, including multiple network addressable systems. FIG. 1 illustrates an example network environment, in which various example embodiments may operate. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like. As FIG. 1 illustrates, particular embodiments may operate in a network environment comprising social networking system 20 and one or more client devices 30. Client devices 30 are operably connected to the network environment via a network service provider, a wireless carrier, or any other suitable means.

In one example embodiment, social networking system 20 comprises computing systems that allow users to communicate or otherwise interact with each other and access content, such as user profiles, as described herein. Social networking system 20 is a network addressable system that, in various example embodiments, comprises one or more physical servers 22 and data store 24. The one or more physical servers 22 are operably connected to computer network 60 via, by way of example, a set of routers and/or networking switches 26. In an example embodiment, the functionality hosted by the one or more physical servers 22 may include web or HTTP servers, FTP servers, as well as, without limitation, web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), and the like.

Physical servers 22 may host functionality directed to the operations of social networking system 20. By way of example, social networking system 20 may host a website that allows one or more users, at one or more client devices 30, to view and post information, as well as communicate with one another via the website. Hereinafter servers 22 may be referred to as server 22, although server 22 may include numerous servers hosting, for example, social networking system 20, as well as other content distribution servers, data stores, and databases. Data store 24 may store content and data relating to, and enabling, operation of the social networking system as digital data objects. A data object, in particular implementations, is an item of digital information typically stored or embodied in a data file, database or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 24 corresponds to one or more of a variety of separate and integrated databases, such as relational databases and object-oriented databases, that maintain information as an integrated collection of logically related records or files stored on one or more physical systems. Structurally, data store 24 may generally include one or more of a large class of data storage and management systems. In particular embodiments, data store 24 may be implemented by any suitable physical system(s) including components, such as one or more database servers, mass storage media, media library systems, storage area networks, data storage clouds, and the like. In one example embodiment, data store 24 includes one or more servers, databases (e.g., MySQL), and/or data warehouses.

Data store 24 may include data associated with different social networking system 20 users and/or client devices 30. In particular embodiments, the social networking system 20 maintains a user profile for each user of the system 20. User profiles include data that describe the users of a social network, which may include, for example, proper names (first, middle and last of a person, a trade name and/or company name of a business entity, etc.) biographic, demographic, and other types of descriptive information, such as work experience, educational history, hobbies or preferences, geographic location, and additional descriptive data. By way of example, user profiles may include a user's birthday, relationship status, city of residence, and the like. The system 20 may further store data describing one or more relationships between different users. The relationship information may indicate users who have similar or common work experience, group memberships, hobbies, or educational history. A user profile may also include privacy settings governing access to the user's information is to other users.

Client device 30 is generally a computer or computing device including functionality for communicating (e.g., remotely) over a computer network. Client device 30 may be a desktop computer, laptop computer, personal digital assistant (PDA), in- or out-of-car navigation system, smart phone or other cellular or mobile phone, or mobile gaming device, among other suitable computing devices. Client device 30 may execute one or more client applications, such as a web browser (e.g., Microsoft Windows Internet Explorer, Mozilla Firefox, Apple Safari, Google Chrome, and Opera, etc.), to access and view content over a computer network. In particular implementations, the client applications allow a user of client device 30 to enter addresses of specific network resources to be retrieved, such as resources hosted by social networking system 20. These addresses can be Uniform Resource Locators, or URLs. In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

A web page or resource embedded within a web page, which may itself include multiple embedded resources, may include data records, such as plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Cascading Style Sheet (CSS), and, frequently, Java. By way of example, HTML enables a page developer to create a structured document by denoting structural semantics for text and links, as well as images, web applications and other objects that can be embedded within the page. Generally, a web page may be delivered to a client as a static document, however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

More particularly, HTML enables developers to embed objects or resources, including web applications, images, or videos, within a structured document such as a web page. Generally, an HTML structured document is written in the form of HTML elements that consist of tags (surrounded by angle brackets) within the structured document content, which act as indicators to a web browser rendering the structured document as to how the document is to be interpreted by the web browser and ultimately presented on a user's display. By way of example, HTML elements may represent headings, paragraphs, hypertext links, embedded media, and a variety of other structures. HTML can include or can load scripts in languages such as JavaScript, which affect the behavior of HTML processors such as conventional web browsers, and Cascading Style Sheets (CSS), which define the appearance and layout of text and other content. HTML elements are the basic components for HTML and have two basis properties: attributes and content. Each element's attribute and content have certain restrictions that must be followed for an HTML element to be considered valid. An HTML element usually has a start tag (e.g., <element-name>) and an end tag (e.g., </element-name>). The element's attributes are contained in the start tag and content is located between the tags (e.g., <element-name attribute="value">Content</element-name>).

By way of example, HTML elements include structural elements (e.g., describing the purpose of text or other content), presentational elements (e.g., describing the appearance of text or other content regardless of its function), and Hypertext elements (e.g., making part of a document into a link to another document). Most elements can take any of several common attributes. By way of example, the id attribute provides a document-wide unique identifier for an element, the class attribute provides a way of classifying similar elements, and the title attribute is used to attach subtextual explanation to an element. HTML also defines several data types for element content, such as script data and stylesheet data, and numerous types for attribute values, including, by way of example, IDs, names, URIs or URLs, numbers, units of length, languages, media descriptors, colors, character encodings, dates and times, etc.

Document structure elements include the root element (defined by the starting and ending tags <html> and </html>, respectively), head elements (defined by the starting and ending tags <head> and </head>, respectively), and body elements (defined by the starting and ending tags <body> and </body>, respectively). The root element tags <html> and </html> delimit the beginning and end of an HTML document, respectively. All other HTML elements of a given HTML document are included within the root element. The head element tags <head> and </head> generally define a container for processing information and metadata for an HTML document. Example document head elements found within the head element container include, by way of example and not by way of limitation, the base element (defined by starting and ending tags <base> and </base>, respectively), which specifies a base uniform resource locator (URL) for all relative href and other links in the HTML document, the link element (defined by starting and ending tags <link> and </link>, respectively), which specifies links to other documents (e.g., for external CSS files), the meta element (defined by starting and ending tags <meta> and </meta>, respectively), which can be used to specify additional metadata about an HTML document, the object element (defined by starting and ending tags <object> and </object>, respectively), used for including generic objects within the document header, the script element (defined by starting and ending tags <script> and </script>, respectively), which can act as a container for script instructions (e.g., JavaScript) or a link to an external script with the src (source) attribute, the style element (defined by starting and ending tags <style> and </style>, respectively), which specifies a style for the document and which can act as a container for style instructions (e.g., for inlined CSS rules), and the title element (defined by starting and ending tags <title> and </title>, respectively), which defines a document title.

The body element <body> represents a container for the displayable content of an HTML document. Example body elements include, by way of example and not by way of limitation, block elements (e.g., basic text and list elements, among others), inline elements (e.g., anchor and phrase elements), and image and object elements. A script element positioned within the body element may be used to place a script in the document (e.g., the script element may contain instructions to dynamically generate block or inline content). The image element (defined by starting and ending tags <img> and </img>, respectively) may be used to insert an image into the document. By way of example, the image element may include an src attribute that specifies a URL where the image is located. The object element (defined by starting and ending tags <object> and </object>, respectively) may be used to insert an object into the document of the type specified in an included type attribute. Another frequently used HTML element is the frameset element, which may be used as an alternative to the body element.

Generally, a web application is an application that may be accessed via a web browser or other client application over a network, or a computer software application that is coded in a web browser-supported language and reliant on a web browser to render the application executable. Web applications have gained popularity largely as a result of the ubiquity of web browsers, the convenience of using a web browser launched at a remote computing device as a client (sometimes referred to as a thin client), and the corresponding ability to update and maintain web applications without distributing and installing software on remote clients. Often, to implement a web application, the web application requires access to one or more resources provided at a backend server of an associated website. Additionally, web applications often require access to additional resources associated with other applications.

Social networking system 20 may include a multitude of features with which users at remote clients 30 may interact during user sessions. In particular embodiments, these features may be implemented as web applications and may utilize JavaScript and CSS resources requested from servers 22 as well as other external servers or data stores. The web applications or resources may be embedded in various underlying or base web pages served to remote clients, such as in frames or iFrames, sections or "divs" and the like. By way of example, the social networking system hosted by Facebook®, Inc. of Palo Alto, Calif., includes or supports such features as the "wall," a space on every user's profile page that allows friends to post messages for the user to see; "pokes," which allows users to send a virtual "poke" to each other (a notification that tells a user that they have been poked); "photos," where users can upload albums and photos; "status," which allows users to inform their friends of their whereabouts and actions; "streams," which may appear in multiple locations on the site, including on every user's homepage, which include information about the activities of the user's connections; "notes," a blogging feature that allows tags and embeddable images as well as blogs imported from other blogging websites and services; as well as a large number of third party applications for which the website serves as a platform. In particular, a user's wall is visible to anyone who is able to see that user's profile, depending on privacy settings, and supports the posting of attachments as well as textual content.

In particular embodiments, the social networking system 20 maintains in data store 24 a number of objects for the different kinds of items with which a user may interact while accessing social networking system 20. In one example embodiment, these objects include user profiles, application objects, and message objects (such as for wall posts, emails and other messages). In one embodiment, an object is stored by the system 20 for each instance of its associated item. These objects and the actions discussed herein are provided for illustration purposes only, and it can be appreciated that an unlimited number of variations and features can be provided on a social networking system 20.

When a user at a client device (e.g., client device 30) desires to view a particular web page (hereinafter also referred to as target structured document) hosted by social networking system 20, the user's web browser, or other document rendering engine or suitable client application, formulates and transmits a request to social networking system 20. The request generally includes a URL or other document identifier as well as metadata or other information. By way of example, the request may include information identifying the user, such as a user ID, as well as information identifying or characterizing the web browser or operating system running on the user's client computing device 30. The request may also include location information identifying a geographic location of the user's client device or a logical network location of the user's client device. The request may also include a timestamp identifying when the request was transmitted.

In particular embodiments, data store 24, or other suitable data store, is further operative to maintain one or more logs of responses to submitted user requests for web pages. By way of example, with reference to FIG. 2, in particular embodiments social networking system 20 maintains a resource utilization log 202 in data store 24, or other suitable data store, that logs information pertaining to requested web pages and resources required or transmitted to client devices for rendering the requested web pages. By way of example, when a page generating process or program 204 executing within social networking system 20 generates a structured document in response to a request for a web page transmitted by a client device, a separate logging process 206 executing within social networking system 20, or alternately, page generating process 204 itself, stores or causes to be stored, a record for the web page in resource utilization log 202 that includes information associated with the response. By way of example, the information stored in the record may include a web page identifier (e.g., the URL of the web page) and the resources, or identifiers of the resources (such as embedded scripts, style sheets and the like), included or embedded in the web page. The record may also include information identifying the user, such as a user ID, as well as information identifying or characterizing the web browser or operating system running on the user's client computing device 30. The record may also include location information identifying a geographic location of the user's client device or a logical network location of the user's client device. The record may also include a timestamp identifying when the request was transmitted by the requesting client device, when the request was received by social networking system 20, or when the response was transmitted to the client device by social networking system 20.

Figure 2:
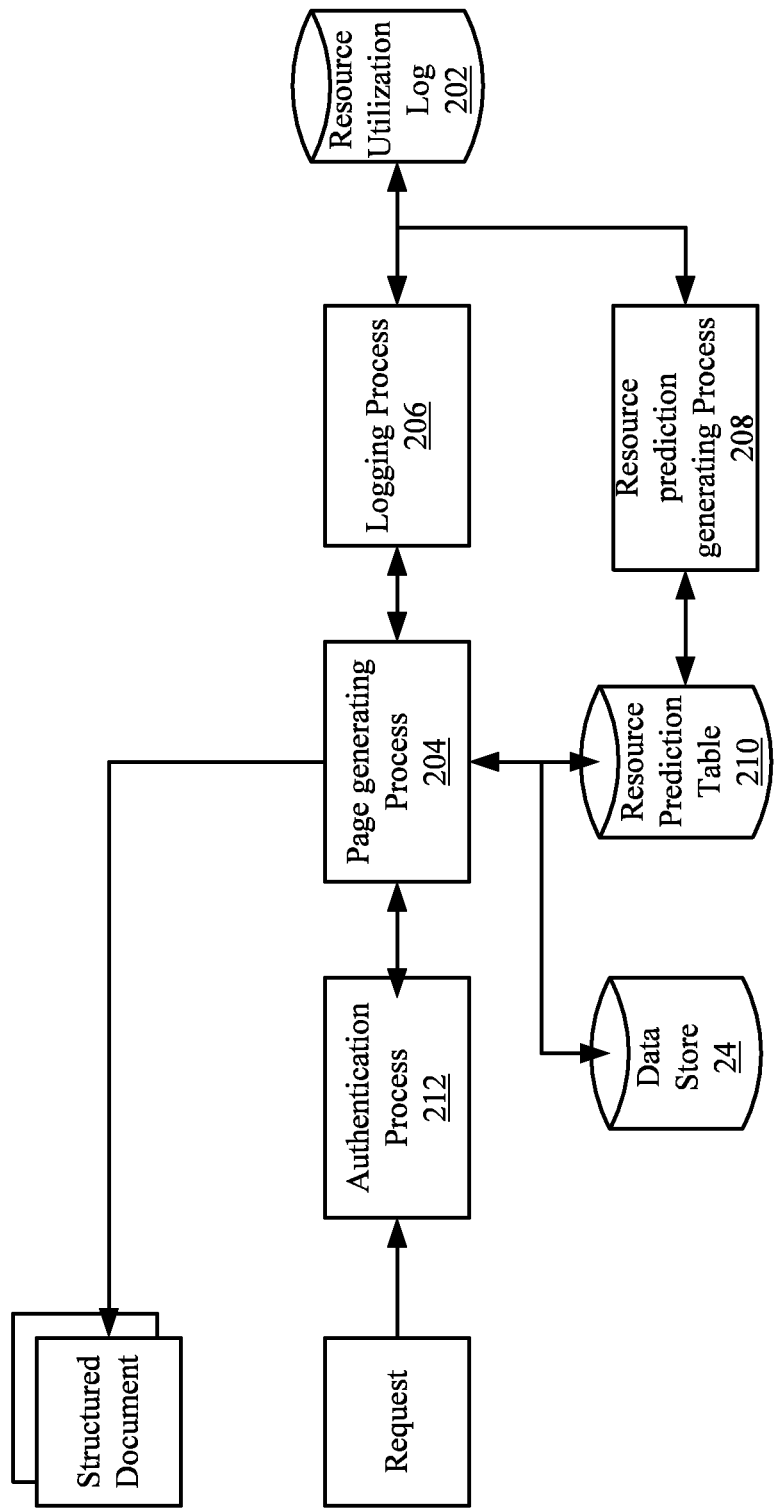
FIG. 2 illustrates a block diagram of example components of an example networking system.
Figure 3:
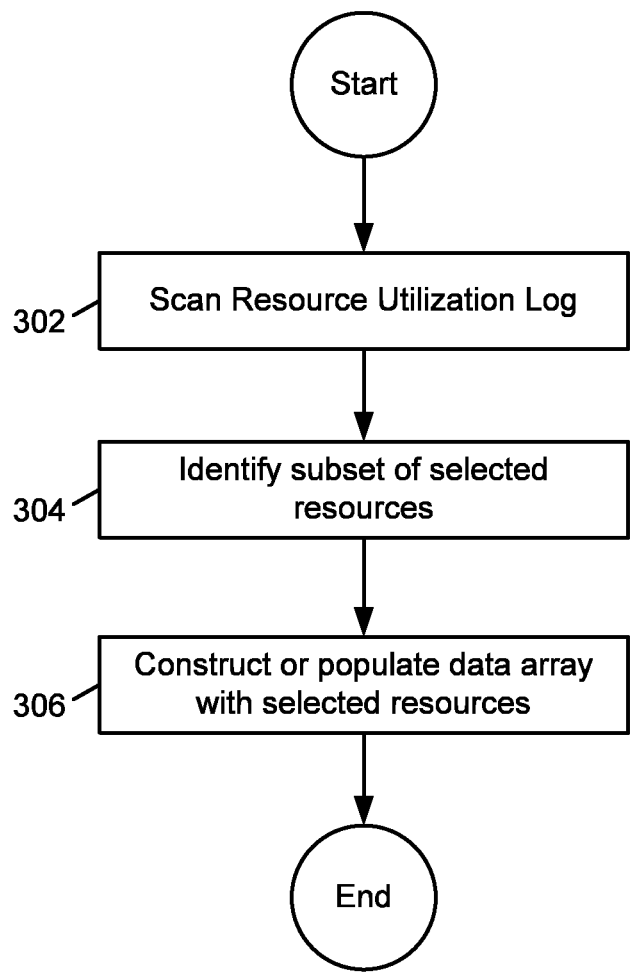
FIG. 3 shows a flowchart illustrating an example method for constructing or populating a resource prediction table.

A method for generating a resource prediction table will now be described with reference to the block diagram of FIG. 2 and the flowchart of FIG. 3. In particular embodiments, social networking system 20 further includes a resource prediction generating process 208 that periodically accesses (and scans), at 302, resource utilization log 202. By way of example, resource prediction generating process 208 may periodically access resource utilization log 202 on an hourly basis, daily basis, weekly basis, or on any other suitable time basis, as well as at predetermined times or in response to certain events or conditions, including in response to receiving a request for a web page hosted by social networking system 20. In particular embodiments, resource prediction generating process 208 scans, offline, resource utilization log 202 for records associated with selected web pages or other structured documents. That is, in particular embodiments, resource prediction generating process 208 only scans resource utilization log 202 for records associated with the selected web pages. By way of example, the selected web pages may include, by way of example and not by way of limitation, home pages, user profile pages, and "canvas" pages (canvas pages may be utilized to render web applications supported by social networking system 20) hosted by social network system 20. These web pages are generally the most "expensive" to generate and transmit, particularly in terms of network resource consumption, as they may be statistically the most requested web pages (each registered user of social networking system 20 is provided with a unique home page and profile page) and/or may generally be characterized as rich in that they may, by way of example, include numerous features and a variety of multimedia content, and as such, generally include a large number of embedded resources to enable such richness. However, although each home, profile, or canvas page may be unique to a particular user, each of these web pages generally includes one or more of the same embedded resources, particularly static resources, also embedded in other pages of the same type associated with or requested by other users (e.g., user A's home page may often include one or more resources that are also included in user B's home page), especially when statistically compared over the same time window of analysis.

In particular embodiments, for each of the selected web pages, resource prediction generating process 208 analyzes the records corresponding to that selected web page, as for example identified by a common URL or other page identifier stored in the records, across all users (e.g., all records for home pages regardless of user). In particular embodiments, for each selected web page, resource prediction generating process 208 identifies, at 304, a subset of one or more selected resources, or identifiers for the selected resources, from all the resources identified in resource utilization log 202 corresponding to the web page. By way of example, in particular embodiments, resource prediction generating process 208 computes a frequency of each resource identified in resource utilization log 202 as being used to render the web page. Resource prediction generating process 208 may then compute a probability that each of the resources is likely to be embedded in the web page in a subsequent response to a subsequent request for the web page. By way of example, assume JavaScript resource A.js was identified in 84 out of 100 records corresponding to a particular web page requested (or for which a response was generated) over a predetermined time window (e.g. the last 7 days, the last month, the last year, or a selected day, week, or month of last year) as determined by a timestamp included in each of the records. In one example embodiment, the probability that A.js will be included or embedded within the structured document of the web page in response to a subsequent request for the web page may be calculated as the number of records in which A.js is identified divided by the total number of records corresponding to the same web page identifier, thus yielding 84/100=0.84 or 84%. Also assume the CSS resource B.css was identified in 47 out of the 100 records corresponding to the particular web page. The probability that B.css will be included or embedded within the structured document of the web page in response to a subsequent request for the web page may be calculated as 47/100=0.47 or 47%.

Resource prediction generating process 208 may then compare the probability for each resource corresponding to the web page to a predetermined threshold value (which may be uniform across all selected web pages or be specifically predetermined for the selected web page). By way of example, a suitable threshold value may be approximately 0.80 or 80% (although the threshold value may vary widely in other embodiments or across different web pages). In particular embodiments, resource prediction generating process 208 identifies, at 304, those resources having a probability greater then the threshold as the selected resources corresponding to the web page. In the above example, A.js would be identified as a selected resource as 84% is greater than the threshold of 80%, while B.css would not be identified as a selected resource as 47% is less than 80%.

In particular embodiments, resource prediction generating process 208 then constructs or populates, at 306, a second data array 210 within data store 24 or other suitable data store that includes the selected web pages and the corresponding selected resources, or identifiers for the selected resources, for each of the selected web pages. By way of example the second data array 210 may take the form of a resource prediction hash table 210 that links web page identifiers for corresponding selected web pages with one or more resource identifiers corresponding to the selected resources identified at 304 for each selected web page.

Figure 4:
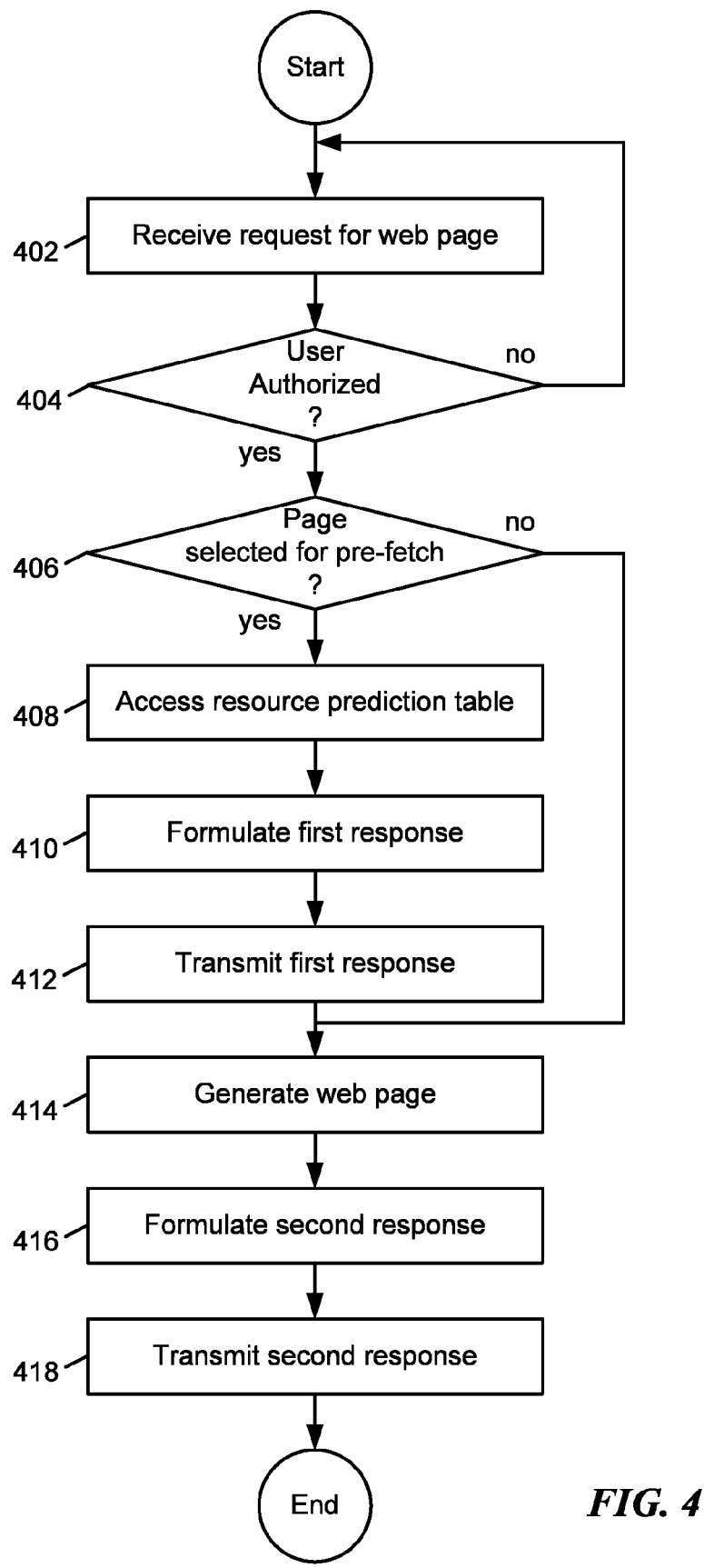
FIG. 4 shows a flowchart illustrating an example method for serving a request for a web page.

A method for serving a request for a web page will now be described with reference to the block diagram of FIG. 2 and the flowchart of FIG. 4. In an example embodiment, the method begins at 402 with receiving a request for a web page. As described above, the request generally includes a URL or other document identifier as well as metadata or other information. By way of example, the request may include information identifying the user, such as a user ID, as well as information identifying or characterizing the web browser or operating system running on the user's client computing device 30. The request may also include location information identifying a geographic location of the user's client device or a logical network location of the user's client device. The request may also include a timestamp identifying when the request was transmitted. At 404, an authentication process 212 may first determine, at 404, whether the user making the request is authorized to receive the web page.

In particular embodiments, at 406, page-generating process 204 determines whether or not the requested web page is one of a subset of selected web pages for which resource pre-fetching may be performed. That is, whether or not the requested web page is one of the selected web pages included in resource prediction hash table 210. If it is determined at 406 that the web page is a selected web page having one or more corresponding predetermined static resources specified in the hash table 210, then the method proceeds, at 408, with the page-generating process 204 accessing hash table 210 and identifying the selected resources predetermined to be likely required or used to generate the requested web page. In particular embodiments, page rendering process 204 then formulates a first response (or first response portion) at 410 comprising a first portion of a structured document that either includes the corresponding selected resources identified in hash table 210 or identifiers to these selected resources (e.g., in the form of script, image, or object elements having corresponding source (src) identifiers for locating the selected resources). The first response portion is then transmitted to the client at 412. In particular embodiments, the first response portion, including the selected resources, or identifiers for the selected resources, is formulated as a first portion of an HTML head element of the structured document. The first portion of the HTML head element including the selected resources may be transmitted to the client device of the user requesting the web page over an HTTP or any other suitable connection. In particular embodiments, the connection over which the first response is transmitted to the client device is a persistent Transmission Control Protocol (TCP) connection. This allows the client to receive, and to begin processing of, resources required for rendering the structured document while the remainder of the page is generated.

In particular embodiments, page generating process 204 then proceeds to generate the web page (e.g., in the form of an HTML or other structured document) at 414 the including structured document code and the content to be displayed as well as the embedded resources, or embedded identifiers for the resources, for rendering the web page, which may include those resources that have already been transmitted in or identified in the first response portion. Page generating process 204 then formulates a second response (or second response portion) at 416 that includes the remainder of the structured document for rendering the web page. That is, in particular embodiments, page generating process 204 first checks which resources in the structured document have already been transmitted or identified in the first response portion transmitted to the client device such that the second response portion, which may generally include a second portion of the HTML head element as well as a body or frameset element, includes all the code, content, and resources (or identifiers thereof) required to render the requested web page other than the resources transmitted in, or identified in, the first response portion. In particular embodiments, one or more of the resources (or identifiers thereof) transmitted in the second response portion may be transmitted in the second portion of the HTML head element. The second response portion is then transmitted to the client at 418. As described above, as the first response portion may be sent over a persistent connection (e.g., a persistent HTTP or TCP connection), the second response portion may be sent over the same connection. For example, the page generating process 204 may write the data of the remainder of the structured document to the socket that corresponds to the connection with the client.

In such a manner, the client device, and particularly a web browser at the client device, may begin downloading, parsing, and executing the resources transmitted in or identified in the first response portion while (or before) page generating process 204 is generating the structured document for the web page. In this way, the web browser may begin processes associated with rendering the web page (such as accessing and initializing scripts, etc.), before the second response is even received and perhaps before the completed remaining portions of the web page is even generated by page generating process 204 (i.e., the rendering of the web page may overlap the generating and/or transmitting of the web page), thereby significantly reducing the latency in rendering the page and, potentially significantly increasing the network performance of the social networking system 20 as a whole.

In particular embodiments, if it is determined at 406 that the web page is not a selected web page (or is a selected web page for which pre-fetch has been disabled) having one or more corresponding predetermined static resources specified in the resource prediction hash table 210, then the method proceeds, according to normal operation with generating the web page at 414, formulating a response at 416 (in this case the second response portion is actually the first response portion as no first response portion was sent), and transmitting the response to the client at 418.

Furthermore, although the described embodiments of the resource prediction hash table 210 and methods of generating and utilizing the resource prediction hash table 210 were described at the page or URL level, it should be appreciated that, in other embodiments, the resource prediction table 210 may be constructed or populated and subsequently utilized based on other filtering criteria. By way of example, a resource prediction table 210 may be constructed for each registered user of social networking system 20. That is, resource prediction generating process 208 may scan resource utilization log 202 and filter the records to identify likely required resources for selected web pages as described above on a per user basis, rather than across all users as described above. Moreover, any other suitable filtering criteria may be used in addition or alternately to filtering the records within resource utilization log 202 based on web page, resource utilization probability, and/or user. By way of example, using other metadata stored in resource utilization log 202, records may be filtered based on geographic or logical network location (e.g., the selected resources sent in the first response to a user in the United States may be different than the selected resources sent in the first response to a user in China), browser type or operation system type (e.g., the selected resources sent in the first response to a client device running the Mozilla Firefox web browser may be different than the selected resources sent in the first response to a client device running the Internet Explorer web browser), among others.

As described herein, any of the described processes or methods can be implemented as a series of computer-readable instructions, embodied or encoded on or within a tangible data storage medium, that when executed are operable to cause one or more processors to implement the operations described above. For smaller datasets, the operations described above can be executed on a single computing platform or node. By way of example, in particular embodiments, the phased generation processes described above with reference to FIGS. 2 and 4 may be implemented by a single server process executing in server 22. That is, the web page generation and serving processes described above may be implemented on server 22. For larger systems and resulting data sets, parallel computing platforms can be used. For example, the resource logging, analyzing, filtering, predicting, and/or selecting operations discussed above can be implemented using Hive to accomplish ad hoc querying, summarization and data analysis, as well as using as incorporating statistical modules by embedding mapper and reducer scripts, such as Python or Perl scripts that implement a statistical algorithm. Other development platforms that can leverage Hadoop or other Map-Reduce execution engines can be used as well. The Apache Software Foundation has developed a collection of programs called Hadoop, which includes: (a) a distributed file system; and (b) an application programming interface (API) and corresponding implementation of MapReduce.

FIG. 1 illustrates an example distributed computing system, consisting of one master server 22a and two slave servers 22b. In some embodiments, the distributed computing system comprises a high-availability cluster of commodity servers in which the slave servers are typically called nodes. Though only two nodes are shown in FIG. 1, the number of nodes might well exceed a hundred, or even a thousand or more, in some embodiments. Ordinarily, nodes in a high-availability cluster are redundant, so that if one node crashes while performing a particular application, the cluster software can restart the application on one or more other nodes.

Multiple nodes also facilitate the parallel processing of large databases. In some embodiments, a master server, such as 22a, receives a job from a client and then assigns tasks resulting from that job to slave servers or nodes, such as servers 22b, which do the actual work of executing the assigned tasks upon instruction from the master and which move data between tasks. In some embodiments, the client jobs will invoke Hadoop's MapReduce functionality, as discussed above.

Likewise, in some embodiments, a master server, such as server 22a, governs a distributed file system that supports parallel processing of large databases. In particular, the master server 22a manages the file system's namespace and block mapping to nodes, as well as client access to files, which are actually stored on slave servers or nodes, such as servers 22b. In turn, in some embodiments, the slave servers do the actual work of executing read and write requests from clients and perform block creation, deletion, and replication upon instruction from the master server.

While the foregoing processes and mechanisms can be implemented by a wide variety of physical systems and in a wide variety of network and computing environments, the server or computing systems described below provide example computing system architectures for didactic, rather than limiting, purposes.

Figure 5:
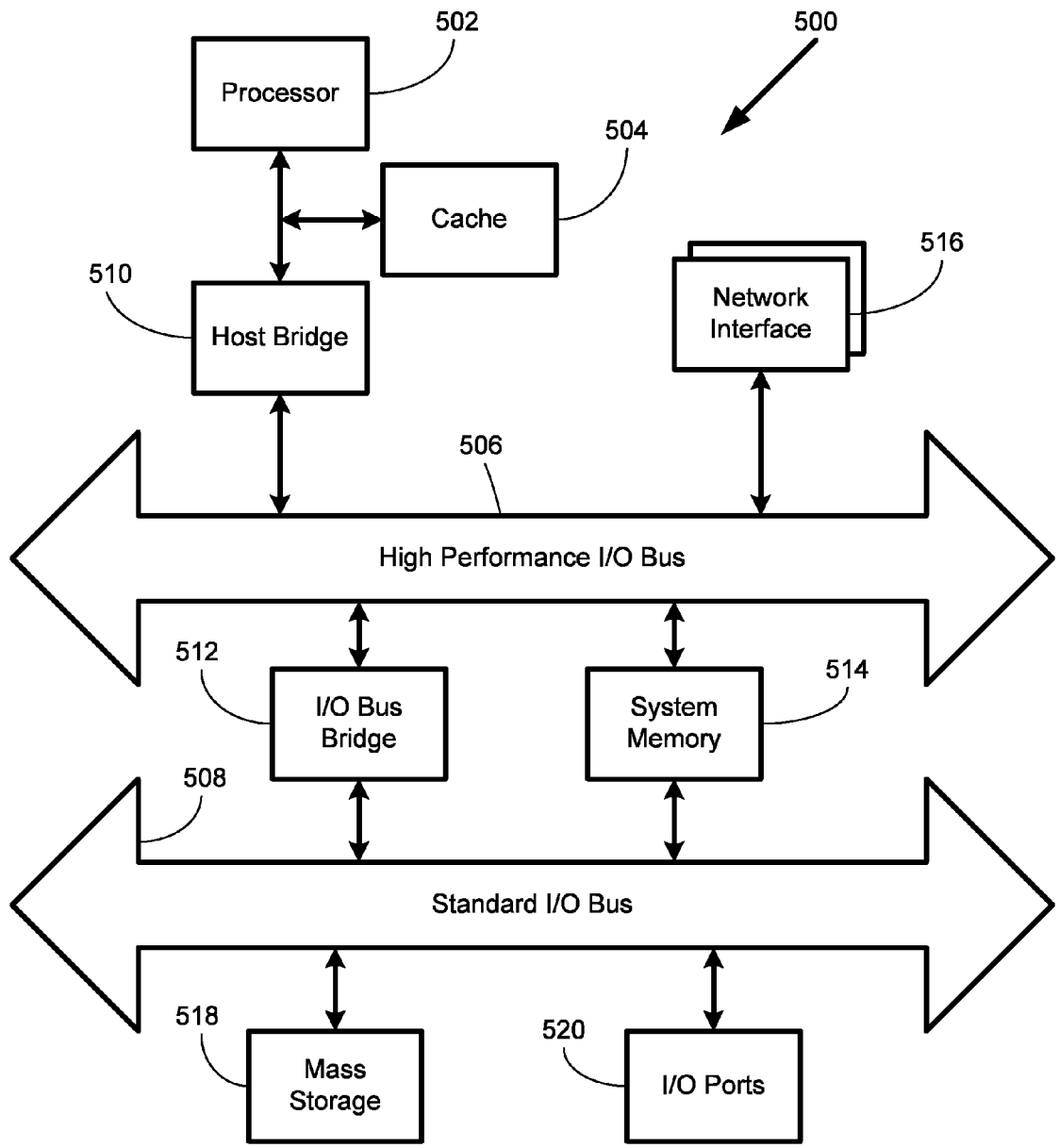
FIG. 5 illustrates an exemplary computer system architecture.

FIG. 5 illustrates an example computing system architecture, which may be used to implement a server 22a, 22b, or a client device 30. In one embodiment, hardware system 500 comprises a processor 502, a cache memory 504, and one or more executable modules and drivers, stored on a tangible computer readable medium, directed to the functions described herein. Additionally, hardware system 500 includes a high performance input/output (I/O) bus 506 and a standard I/O bus 508. A host bridge 510 couples processor 502 to high performance I/O bus 506, whereas I/O bus bridge 512 couples the two buses 506 and 508 to each other. A system memory 514 and one or more network/communication interfaces 516 couple to bus 506. Hardware system 500 may further include video memory (not shown) and a display device coupled to the video memory. Mass storage 518, and I/O ports 520 couple to bus 508. Hardware system 500 may optionally include a keyboard and pointing device, and a display device (not shown) coupled to bus 508. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 500 are described in greater detail below. In particular, network interface 516 provides communication between hardware system 500 and any of a wide range of networks, such as an Ethernet (e.g., IEEE 802.3) network, a backplane, etc. Mass storage 518 provides permanent storage for the data and programming instructions to perform the above-described functions implemented in the servers 22a, 22b, whereas system memory 514 (e.g., DRAM) provides temporary storage for the data and programming instructions when executed by processor 502. I/O ports 520 are one or more serial and/or parallel communication ports that provide communication between additional peripheral devices, which may be coupled to hardware system 500.

Hardware system 500 may include a variety of system architectures; and various components of hardware system 500 may be rearranged. For example, cache 504 may be on-chip with processor 502. Alternatively, cache 504 and processor 502 may be packed together as a "processor module," with processor 502 being referred to as the "processor core." Furthermore, certain embodiments of the present invention may not require nor include all of the above components. For example, the peripheral devices shown coupled to standard I/O bus 508 may couple to high performance I/O bus 506. In addition, in some embodiments, only a single bus may exist, with the components of hardware system 500 being coupled to the single bus. Furthermore, hardware system 500 may include additional components, such as additional processors, storage devices, or memories.

In one implementation, the operations of the embodiments described herein are implemented as a series of executable modules run by hardware system 500, individually or collectively in a distributed computing environment. In a particular embodiment, a set of software modules and/or drivers implements a network communications protocol stack, parallel computing functions, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 502. Initially, the series of instructions may be stored on a storage device, such as mass storage 518. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 516. The instructions are copied from the storage device, such as mass storage 518, into memory 514 and then accessed and executed by processor 502.

An operating system manages and controls the operation of hardware system 500, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. By way of example, while embodiments of the present disclosure have been described as operating in connection with a social networking website, various embodiments of the present invention can be used in connection with any communications facility that supports web applications. Furthermore, in some embodiments the term "web service" and "web site" may be used interchangeably and additionally may refer to a custom or generalized API on a device, such as a mobile device (e.g., cellular phone, smart phone, personal GPS, personal digital assistance, personal gaming device, etc.), that makes API calls directly to a server.

The invention claimed is:

1. A method comprising:
  receiving, by a computing system, a request from a client device for a target structured document;
  in response to the received request from the client device and in a first response phase:
    accessing, by the computing system, a data structure comprising an entry for the target structured document and one or more first resources associated with the target structured document;
    for each of one or more of the first resources associated with the target structured document:
      computing a probability for the first resource that represents a likelihood that the first resource will be included in a response to a future request for the target structured document;
      comparing the probability to a first predetermined threshold; and
      when the probability exceeds the first predetermined threshold, identifying the first resource as a selected first resource for the target structured document;
    generating, by the computing system, a first response portion comprising one or more of:
      one or more of the selected first resources; or
      one or more references to one or more of the selected first resources;
    sending, by the computing system, the first response portion to the client device; and further in response to the received request from the client device and in a second response phase taking place after sending the first response portion:
for each of one or more second resources associated with the target structured document:
computing a probability for the second resource that represents a likelihood that the second resource will be included in a response to a future request for the target structured document;
comparing the probability to a second predetermined threshold; and
when the probability exceeds the second predetermined threshold, identifying the second resource as a selected second resource for the target structured document;
generating, by the computing system, a second response portion comprising structured document language code for the target structured document and one or more of:
one or more of the selected second resources associated with the target structured document; or
one or more references to one or more of the selected second resources; and
sending, by the computing system, the second response portion to the same client device.

2. The method of claim 1, wherein:
the target structured document comprises a Hyper Text Markup Language (HTML) document;
the HTML document comprises a head element and one or more other HTML elements;
the first response portion comprises a first portion of the head element; and
the second response portion comprises the remainder of the HTML document including a second portion of the head element.

3. The method of claim 1, wherein none of the selected second resources are identical to any of the selected first resources.

4. The method of claim 1, wherein one or more of the selected first resources or one or more of the selected second resources each comprise a JavaScript script, a Cascading Style Sheet (CSS) resource, a web application resource, an image resource, a video resource, or an audio resource.

5. The method of claim 1, wherein one or more of the first resources have been previously determined to have at least a predetermined probability to be included in a response to a future request for the target structured document that exceeds a predetermined threshold value.

6. The method of claim 1, wherein the first response portion and the second response portion are sent to the client device over a persistent network connection.

7. The method of claim 1, further comprising logging, in a data store, one or more of the selected second resources and one or more of the first selected resources that are determined to be required to render the target structured document.

8. A system comprising:
one or more processors; and
a memory coupled by the processors comprising instructions executable by the processors, the processors being operable when executing the instructions to:
receive a request from a client device for a target structured document;
in response to the received request from the client device and in a first response phase:
access a data structure comprising an entry for the target structured document and one or more first resources associated with the target structured document;
for each of one or more of the first resources associated with the target structured document:
compute a probability for the first resource that represents a likelihood that the first resource will be included in a response to a future request for the target structured document;
compare the probability to a first predetermined threshold; and
when the probability exceeds the first predetermined threshold, identify the first resource as a selected first resource for the target structured document;
generate a first response portion comprising one or more of:
one or more of the selected first resources; or
one or more references to one or more of the selected first resources;
send the first response portion to the client device; and
further in response to the received request from the client device and in a second response phase taking place after sending the first response portion:
for each of one or more second resources associated with the target structured document:
compute a probability for the second resource that represents a likelihood that the second resource will be included in a response to a future request for the target structured document;
compare the probability to a second predetermined threshold; and
when the probability exceeds the second predetermined threshold, identify the second resource as a selected second resource for the target structured document;
generate a second response portion comprising structured document language code for the target structured document and one or more of:
one or more of the selected second resources associated with the target structured document; or
one or more references to one or more of the selected second resources;
and
send the second response portion to the same client device.

9. The system of claim 8, wherein:
the target structured document comprises a Hyper Text Markup Language (HTML) document;
the HTML document comprises a head element and one or more other HTML elements;
the first response portion comprises a first portion of the head element; and
the second response portion comprises the remainder of the HTML document including a second portion of the head element.

10. The system of claim 8, wherein none of the selected second resources are identical to any of the selected first resources.

11. The system of claim 8, wherein one or more of the selected first resources or one or more of the selected second resources each comprise a JavaScript script, a Cascading Style Sheet (CSS) resource, a web application resource, an image resource, a video resource, or an audio resource.

12. The system of claim 8, wherein one or more of the first resources have been previously determined to have at least a predetermined probability to be included in a response to a future request for the target structured document that exceeds a predetermined threshold value.

13. The system of claim 8, wherein the first response portion and the second response portion are sent to the client device over a persistent network connection.

14. The system of claim 8, wherein the processors are further operable when executing the instructions to log, in a data store, one or more of the selected second resources and one or more of the first selected resources that are determined to be required to render the target structured document.

15. One or more computer-readable non-transitory storage media embodying software operable when executed to:
receive a request from a client device for a target structured document;
in response to the received request from the client device and in a first response phase:
access a data structure comprising an entry for the target structured document and one or more first resources associated with the target structured document;
for each of one or more of the first resources associated with the target structured document:
compute a probability for the first resource that represents a likelihood that the first resource will be included in a response to a future request for the target structured document;
compare the probability to a first predetermined threshold; and
when the probability exceeds the first predetermined threshold, identify the first resource as a selected first resource for the target structured document;
generate a first response portion comprising one or more of:
one or more of the selected first resources; or
one or more references to one or more of the selected first resources;
send the first response portion to the client; and
further in response to the received request from the client device and in a second response phase taking place after sending the first response portion:
for each of one or more of the second resources associated with the target structured document:
compute a probability for the second resource that represents a likelihood that the second resource will be included in a response to a future request for the target structured document;
compare the probability to a second predetermined threshold; and
when the probability exceeds the second predetermined threshold, identify the second resource as a selected second resource for the target structured document;
generate a second response portion comprising structured document language code for the target structured document and one or more of:
one or more of the selected second resources associated with the target structured document; or
one or more references to one or more of the selected second resources; and
send the second response portion to the same client device.

16. The media of claim 15, wherein:
the target structured document comprises a Hyper Text Markup Language (HTML) document;
the HTML document comprises a head element and one or more other HTML elements;
the first response portion comprises a first portion of the head element; and
the second response portion comprises the remainder of the HTML document including a second portion of the head element.

17. The media of claim 15, wherein none of the selected second resources are identical to any of the selected first resources.

18. The media of claim 15, wherein one or more of the selected first resources or one or more of the selected second resources each comprise a JavaScript script, a Cascading Style Sheet (CSS) resource, a web application resource, an image resource, a video resource, or an audio resource.

19. The media of claim 15, wherein one or more of the first resources have been previously determined to have at least a predetermined probability to be included in a response to a future request for the target structured document that exceeds a predetermined threshold value.

20. The media of claim 15, wherein the first response portion and the second response portion are sent to the client device over a persistent network connection.

21. The media of claim 15, wherein the media embodying software is further operable when executed to log, in a data store, one or more of the selected second resources and one or more of the first selected resources that are determined to be required to render the target structured document.

* * * * *